United States Patent
Kamm et al.

(10) Patent No.: US 6,830,345 B2
(45) Date of Patent: Dec. 14, 2004

(54) IMAGING DEVICE

(75) Inventors: Markus Kamm, Karlsruhe (DE); Evangelos Zoidis, Waiblingen (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 10/618,130

(22) Filed: Jul. 11, 2003

(65) Prior Publication Data

US 2004/0017547 A1 Jan. 29, 2004

(30) Foreign Application Priority Data

Jul. 15, 2002 (EP) ............................................. 02015791

(51) Int. Cl.$^7$ ................................................. H04N 5/74
(52) U.S. Cl. ..................................... 353/122; 348/333.1
(58) Field of Search .............. 353/122, 94; 348/333.01, 348/333.1

(56) References Cited

U.S. PATENT DOCUMENTS

| | | |
|---|---|---|
| 2,744,444 A | 5/1956 | Breitman |
| 3,615,127 A | 10/1971 | Land |
| 4,179,199 A | 12/1979 | Land |
| 5,258,844 A * | 11/1993 | Nakayama et al. ...... 348/333.1 |
| 5,300,976 A * | 4/1994 | Lim et al. .................... 396/374 |
| 5,315,334 A * | 5/1994 | Inana ......................... 396/374 |
| 5,483,285 A * | 1/1996 | Lim et al. ................... 348/341 |
| 5,528,297 A * | 6/1996 | Seegert et al. ........... 348/333.1 |
| 5,673,084 A | 9/1997 | Lim et al. |
| 2002/0176015 A1 * | 11/2002 | Lichtfuss ................. 348/333.1 |

OTHER PUBLICATIONS

Patent Abstracts of Japan, vol. 18, No. 402, Jul. 27, 1994, JP 06 118377.

* cited by examiner

*Primary Examiner*—William C. Dowling
(74) *Attorney, Agent, or Firm*—Frommer Lawrence & Haug LLP; William S. Frommer; Dennis M. Smid

(57) ABSTRACT

An imaging device is proposed which is adapted for optically imaging an object (O) to be imaged so as to generate object image (OI) and which is adapted for optically projecting a display image (DI) so as to generate a projection image (PI).

17 Claims, 7 Drawing Sheets

IMAGING DEVICE

Figure 1:
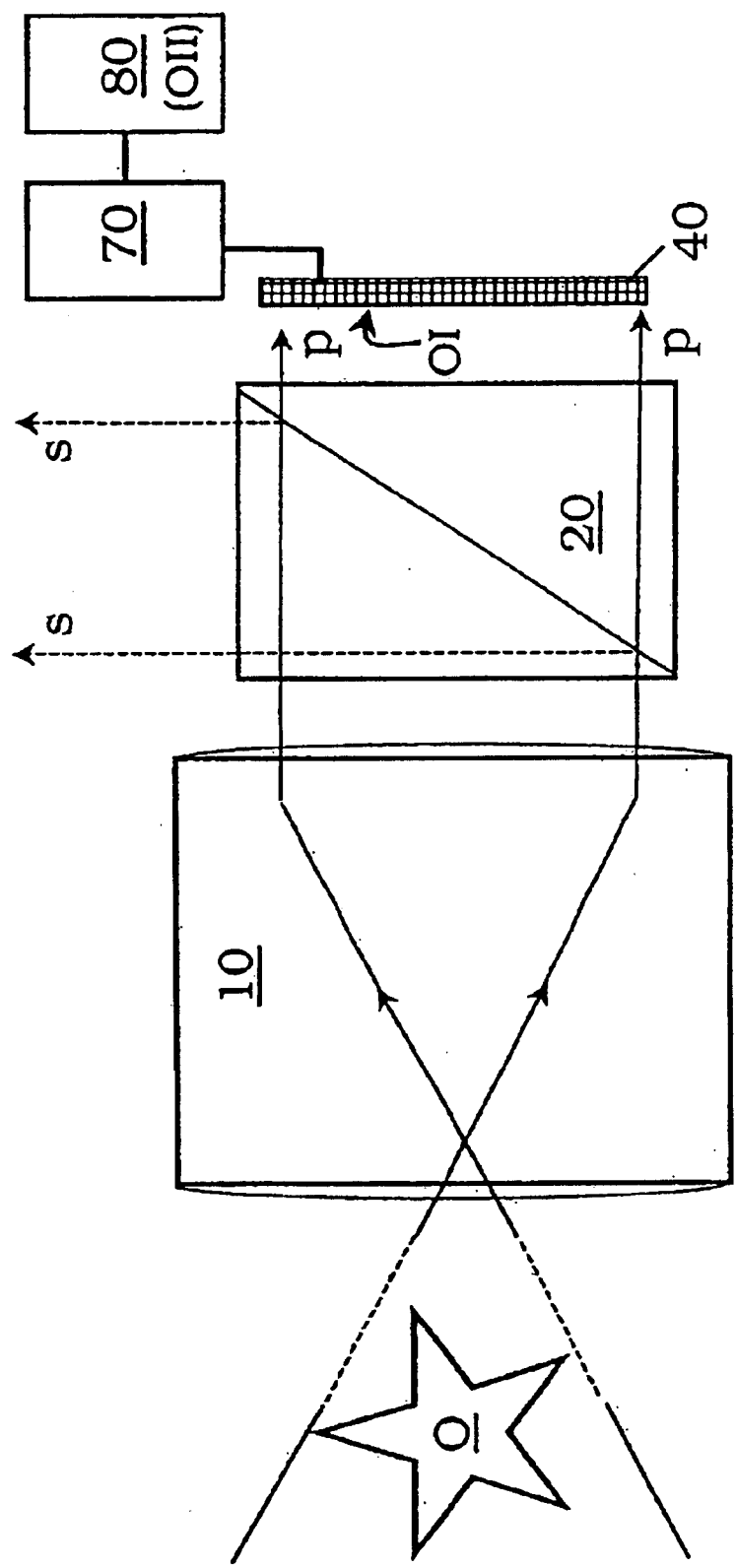

The present invention relates to an imaging device and more particular to an imaging device having combined imaging and projecting capabilities.

Nowadays, many electronic appliances are available which have imaging and in particular image recording capabilities. One objective in further developing known opto-electronic appliances is to reduce the size of such appliances, on the one hand, and to improve the functionalities of these appliances, on the other hand, in particular with respect to the plurality or multiplicity of different functions.

It is an object of the present invention to provide an imaging device which is further decreased in size and further increased with respect to the plurality of its functions.

The object is achieved with an imaging device according to claim 1. preferred embodiment of the inventive imaging device are within the scope of the dependent subclaims.

According to the present invention the proposed image device is adapted for optically imaging in a first imaging mode an object to be imaged so as to generate at least one real object image corresponding to said object. Additionally, according to the invention the imaging device is adapted for optically projecting in a second imaging mode a display image so as to generate at least one real projection image corresponding to said display image.

It is therefore a basic idea of the present invention to combine in one single imaging device imaging or recording capabilities with projecting capabilities. Therefore. only one device is necessary to image an object to generate at least one real object image which corresponds to said object and to optically project a given display image to be projected. In contrast, the prior art needs at least two devices to realize both purposes of imaging and of projecting. For instance for imaging a camcorder is involved, and for projecting an image projector is involved.

According to a preferred embodiment of the inventive imaging device said imaging device is adapted for externally projecting said display image so as to obtain an external real projection image. Therefore, the inventive imaging device can be used to generate a projection image on an external screen, or the like.

In accordance with a further preferred embodiment of the present invention, the inventive imaging device is provided with an optical objective arrangement. Said optical objective arrangement or a part thereof is adapted to be used or to work in said first imaging mode as an image recording objective or a camera objective or as a part thereof. Additionally, said optical objective arrangement or a part thereof is adapted to be used or to work in a said second imaging mode as an image projecting objective or as a projector objective or as a part thereof. Therefore, according to this particular measure parts of the inventive imaging device can be used for different working modes. Consequently, the number of components and therefore the space necessary for realizing the invention are reduced.

It is of particular advantage, that the inventive image device is adapted for generating said object image in an analogue or digital manner.

For realizing the generation and/or the recording of said real object image, image sensor means are provided.

According to an advantageous embodiment of the present invention said image sensor means comprises at least one charge-coupled device. Also a plurality of charge-coupled devices, for instance for different spectral components or colours, may be provided.

Alternatively or additionally, it is advantageous to provide storage means for storing said object image, said display image, derivatives thereof and/or corresponding image information thereof.

According to a further preferred advantageous embodiment an evaluation/control unit is provided for controlling at least said first and second imaging modes.

Additionally, said evaluation/control unit may be adapted to extract, in particular from said image sensor means, to evaluate and/or to store on said storage means image information corresponding to said real object image.

Further, said evaluation/control unit may be adapted to control the formation of said projection image, in particular based on image information, in particular stored and read from said storage means and/or in particular externally supplied, corresponding to said display image to be projected.

According to a further preferred embodiment of the invention an illumination unit is provided for optically projecting together with said optical objective arrangement, in particular in the second imaging mode, said display image so as to obtain said projection image.

It is of further advantage if said illumination unit is adapted to be controlled by said evaluation/control unit and/or by said storage means.

Further, said illumination unit advantageously comprises a light source device appropriate for projection purposes, in particular a high pressure gas discharge lamp arrangement, a LED arrangement and/or the like.

Further, said illumination unit comprises a light valve device, in particular a micro-display, a LCD-device, a liquid-crustal-on-silicon (LcoS) device, and/or a digital mirror device (DMD), for generating said display image or a preform thereof, in particular based on said corresponding image information.

In the inventive imaging device said light valve device may comprise a single light valve for all fundamental colours or one light valve for each of said fundamental colours.

The inventive imaging device is preferable adapted to display images currently taken and/or previously recorded to a spectator by displaying in a viewfinder mode respective images by means of provided viewfinder optics.

Said viewfinder optics may comprise a viewfinder screen for generating a real image.

Alternatively, said viewfinder optics may comprise a viewfinder eyepiece for generating a virtual image.

preferably, the inventive imaging device is adapted to process a plurality of images, in particular sequences thereof or movies.

It is of further advantage if the inventive imaging device is formed as a camcorder device having projector capabilities.

These and further aspects of the present invention will be now explained in more detail based on the following remarks:

A device is presented which e. g. records video pictures like a camcorder and—e. g. after recording —can project the video pictures onto a screen. Both application modes—camera and projector—may share the same lens for both, imaging the pictures and projecting the pictures. Additionally, parts of the projection unit can be used as electronic viewfinder.

In the camcorder mode an objective lens is used to form a real image of a subject onto an image sensor, e. g. CCD (Charge Coupled Device). The image is recorded, analogue or digitally, and stored on a memory device or storage means. A provided electronic viewfinder may be used for giving immediate feedback of the recorded scene. In viewfinders the picture is displayed on a small-sized display, e. g. TFT-LCD (Thin Film Transistor driven Liquid Crystal Display) or LCoS (Liquid Crystal on Silicon. Reflective display type).

In the projector mode one or more display devices, e. g. pSI-LCD (Poly-Silicon driven Liquid Crystal Display, Transmissive display type), LCoS (Liquid Crystal on Silicon, Reflective display type) or DMD (Digital Mirror Device, Reflective display type) may be used to display a picture which is imaged by means of a projection objective onto a screen. A lamp with sufficient lumen output and an optical illumination unit with good efficiency is necessary in order to illuminate the display device and to get a bright screen image.

A polarizing beam splitter PBS transmitting one polarization component of light and reflecting the complementary one can be used in these modes. Electronic half-wave retarders which can switch the polarization direction of polarized light may be involved. They usually consist of an aligned liquid crystal layer filled between two glass plates and can switch their optical properties by applying an electrical field.

Known video projectors and camcorders are separate devices. This invention describes how to integrate the device concepts into one device. Components of the device are shared for both purposes to save space, weight and cost.

In the following these and further aspects of the present invention will be explained in more detail taking reference to the accompanying Figures based on preferred embodiments of the present invention.

FIG. 1 elucidates the elements and the process for the inventive first imaging or camcorder mode by means of a schematical and cross-sectional side view.

Figure 2:
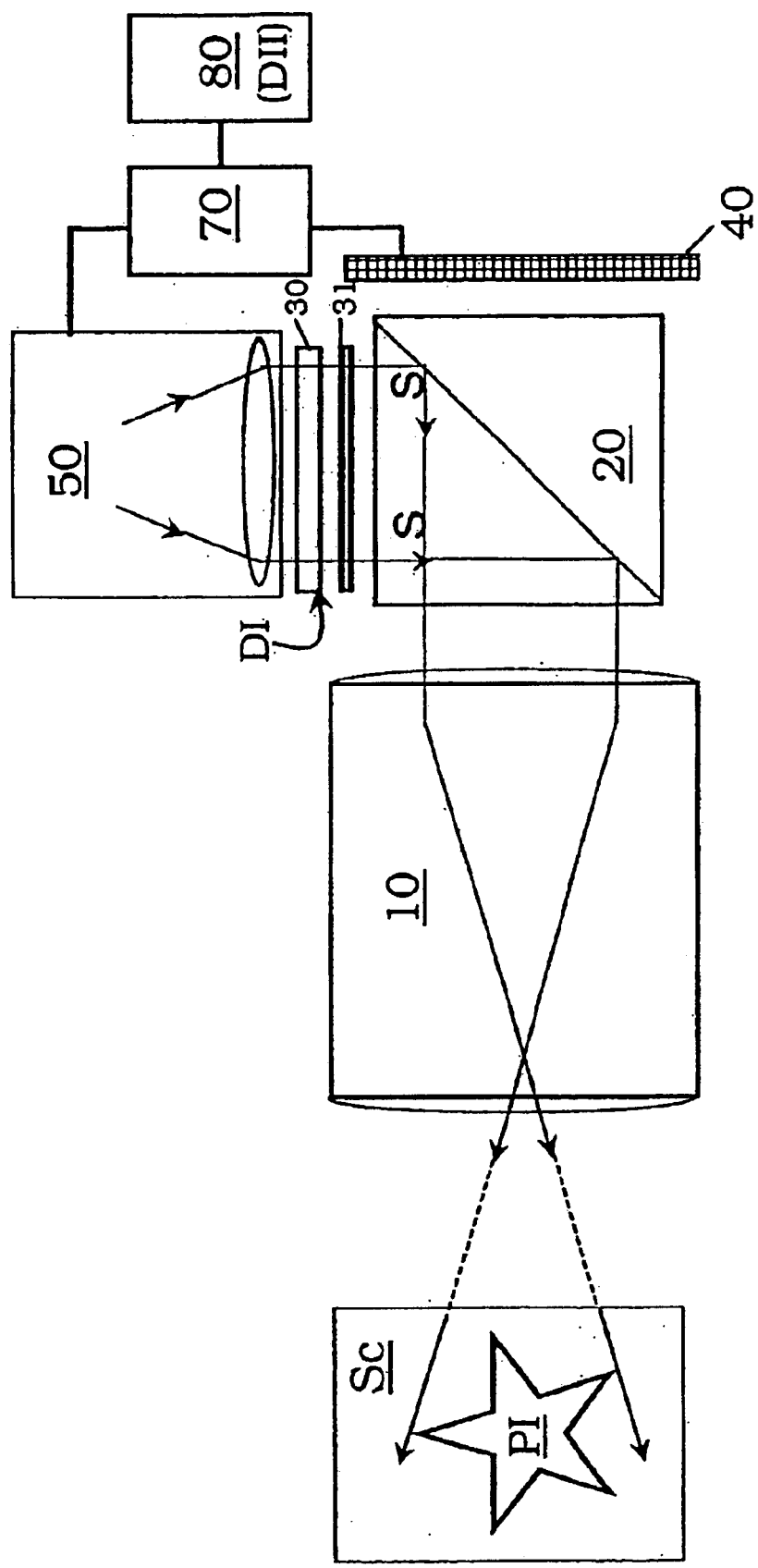

FIG. 2 elucidates the elements and the process for the inventive second imaging or projection mode by means of a schematical and cross-sectional side view.

Figure 3:
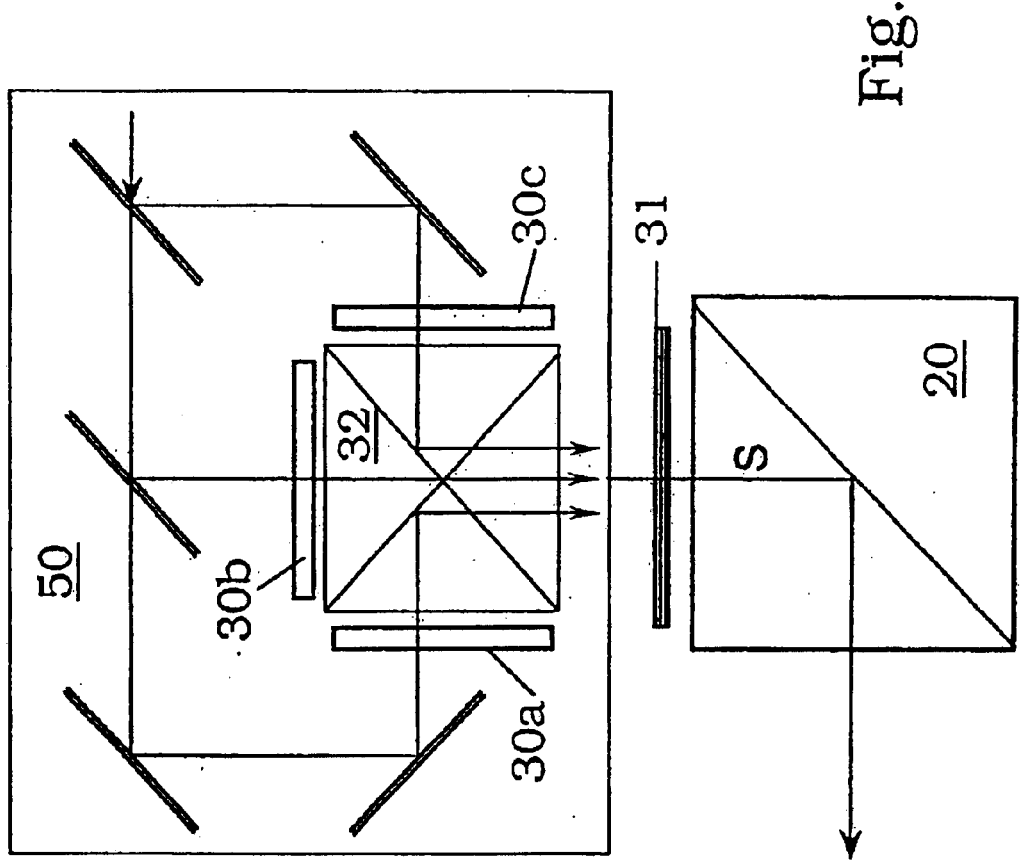
Figure 4:
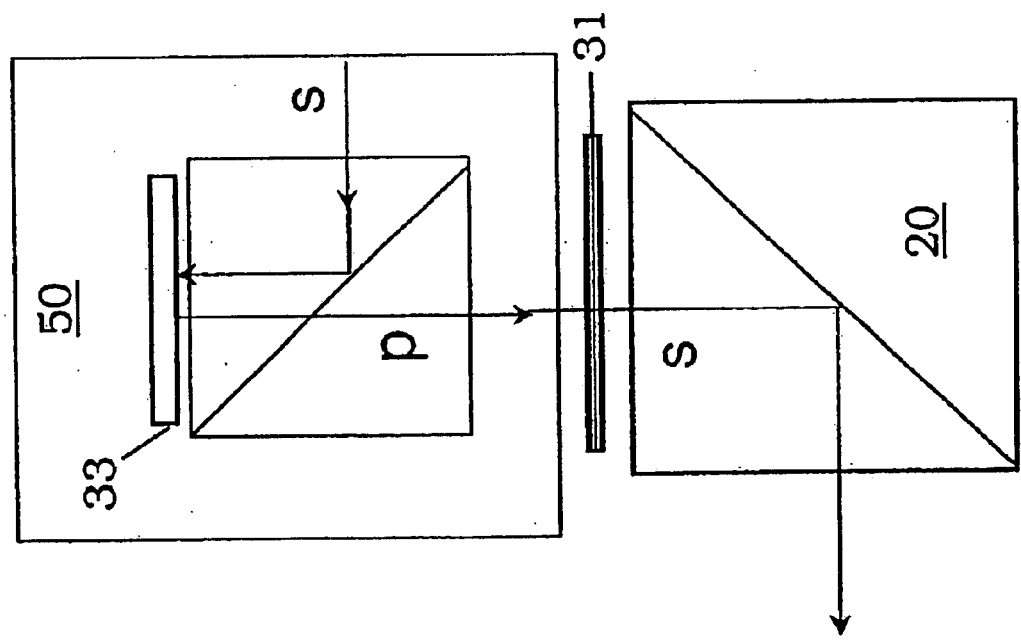

FIGS. 3, 4 elucidate different types of illumination units to be involved in the inventive concept.

Figure 5:
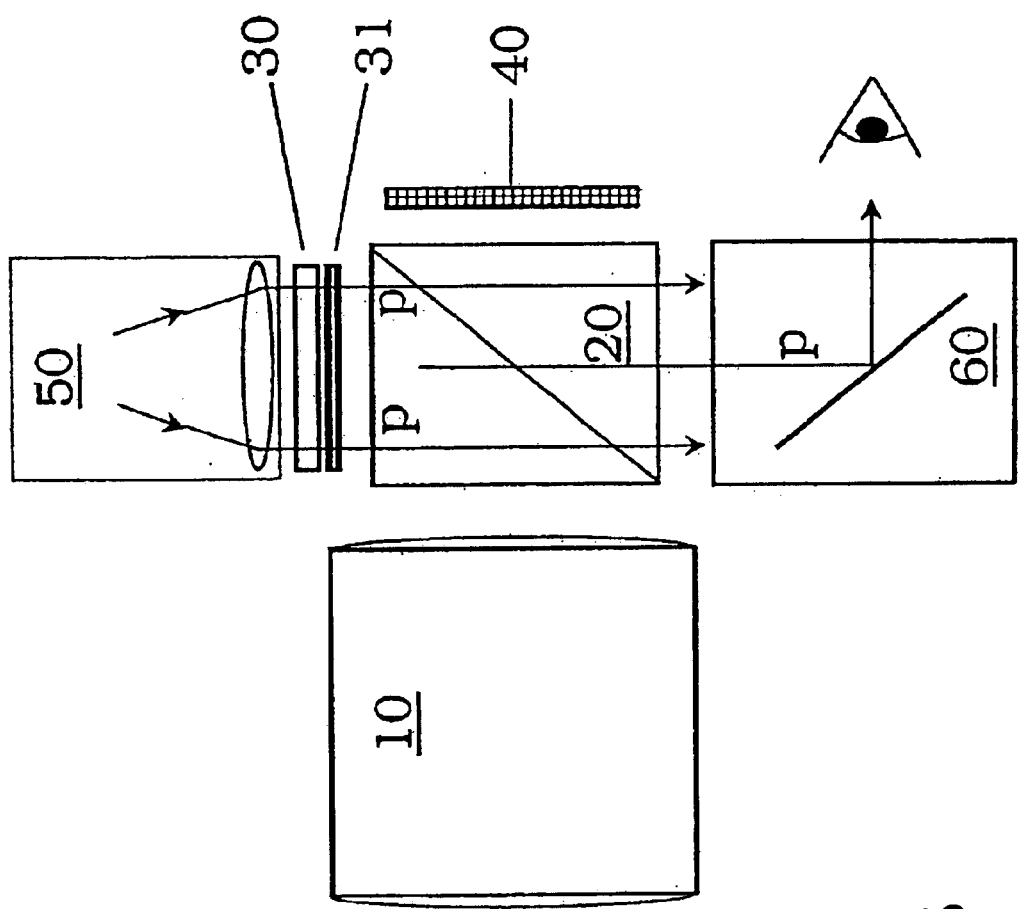
Figure 6:
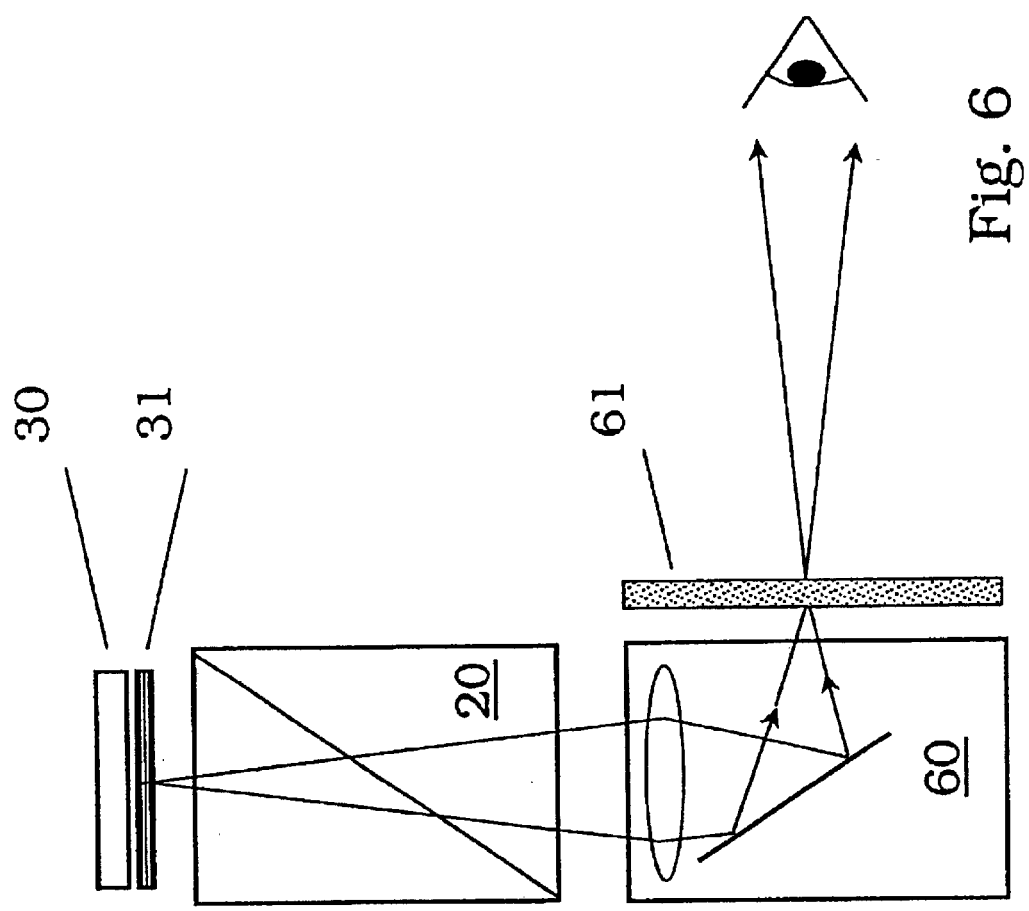
Figure 7:
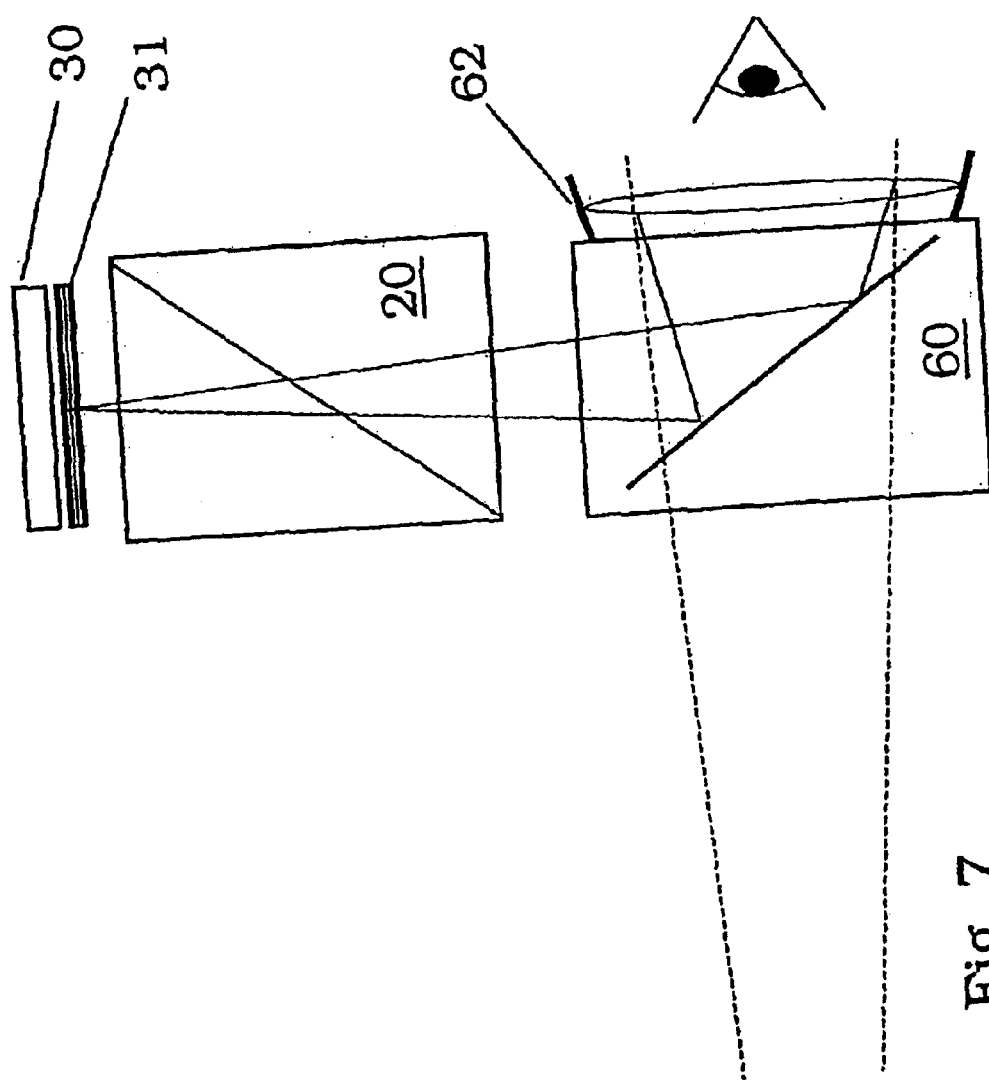

FIGS. 5–7 demonstrate by means of a schematical and cross-sectional side view different embodiments of view finders to be employed in the inventive concept.

In the following similar elements having similar functions or a similar structure are indicated with identical reference symbols. Detailed descriptions of these elements are not always repeated.

FIGS. 1 and 2 elucidate by means of a schematical side view the inventive concepts for imaging an object and projecting a display image.

In the camcorder mode of FIG. 1 pictures are taken. A subject or object O is imaged by means of the lens or objective arrangement 10 onto an image sensor 40. The polarizing beam splitter PBS 20 has no function in this mode. It splits the incoming light into the linear polarized components S (Perpendicular, from the German word "Senkrecht") and p (Parallel to the plane of incidence). polarizing the light has in general no influence on the image quality, because the light coming from the subject is in most cases unpolarized. In some cases, where the subject contains specular reflexes, the light can be partly polarized due to Fresnel reflections. In that case a revolving half-wave retarder, mounted in front of the lens 10, could help to minimize these reflections. It has to be noted, that the intensity which is detected by the image sensor is halved due to polarization.

The projection mode is shown in FIG. 2. A display picture or display image DI picture is projected towards a screen S. The LCD, where a picture is displayed, is illuminated by the illumination unit 50. The illumination unit 50 contains a light source and optical parts to collect and polarize the light. The revolving half-wave retarder 31 is in a position to transform the polarization state into the S-state. This S-polarized light is reflected at the PBS 20 and going through the lens 10 towards the screen S, thereby projecting the picture DI displayed on the LCD onto the screen so as to generate a projection image PI.

In the embodiments shown in FIGS. 1 and 2 the image sensor device 40, the LCD panel 30, and the illumination unit 50 are respectively connected with a provided evaluation/control unit 70 and with storage means 80 in which information OII with respect to the object image of the object O and information DII with respect to the display image DI can be stored.

Transmissive LCDs as shown in FIG. 2 have currently too slow response times to be used in a single panel embodiment with time sequential colour generation. These panels are generally used in 3-panel embodiments as shown in FIG. 3. The panels 30a, 30b and 30c are for the red, green and blue channel, respectively. The light is recombined by the X-cube 32.

The 3-panel embodiment in FIG. 3 has the drawback of being bulky. The illumination unit 50 is complex in order to split the white beam in its primary colours and to illuminate all panels.

As an alternative a more compact single panel LcoS 33 embodiment is shown in FIG. 4.

The general viewfinder mode is shown in FIG. 5. The currently taken images or the previously recorded images are displayed on the LCD and imaged by means of the viewfinder optic 60 to the spectator. The revolving half-wave retarder 31 is moved to a position, where the outgoing light is transformed into the P-state, thus transmitting the PBS 10 and entering the viewfinder optic 60. The viewfinder optic 60 contains lenses to correct image distortions and mirrors or prisms for folding the optical path. The illumination source of the illumination unit 50 has to be dimmed or a separate illumination source with lower intensity has to be used in order to adapt the brightness to the small-sized viewfinder image and to save power.

A first viewfinder embodiment is shown in FIG. 6. A real image of the picture displayed at the LCD is formed on the diffusing viewfinder screen 61. The spectator sees a real image on the screen 61.

A further viewfinder embodiment is shown in FIG. 7. The spectator sees a virtual image of the picture displayed on the LCD when watching into the eyepiece 62.

The mechanically revolving half-wave retarder 31 could be replaced by a liquid crystal cell. The liquid crystal cell switches the polarization state by applying an electrical potential instead of mechanically revolving the retarder.

The polarizing beam splitter could be replaced by a reflex mirror shutter. This shutter would be "on" in the projection mode, where the light coming from the illumination unit 50 is reflected by the mirror shutter towards the lens 10. In the camcorder mode as well as in the viewfinder mode this shutter would be "off" in the sense that light can pass to reach the image sensor 40 or the viewfinder 60 respectively. In this case the half-wave retarder 31 would be no longer necessary.

Compared to using separate camcorder and projector devices the present invention is advantageous with respect to the costs and with respect to the compactness.

1 Emitting Device
10 Optical Objective Arrangement, Lens Arrangement
20 Beam Splitter Device, Polarization Beam Splitter
30 LCD-Device, Light Valve Device
30a–c LCD-Device, Light Valve Device
31 Retarder Device, Revolving Half-Wave Retarder
32 Light Mixing device, X-cube
33 Liquid-crystal-on-silicon (LCoS) device or light valve panel
40 Image Sensor Means, Image Sensor, CCD
50 Illumination Unit
60 View Finder Optics
61 Viewfinder screen
62 Viewfinder eyepiece
70 Evaluation/Control Unit
80 Storage Means
DI Display Image
DII Image Information for Display Image
O Object
OI Object Image
OII Image Information for Object Image
PI Projection Image
P P-polarized state or component
S S-polarized state or component
Sc Screen

What is claimed is:

1. Imaging device, which is adapted for optically imaging in a first imaging mode an object (0) to be imaged so as to generate at least one real object image (OI) corresponding to said object (0) and
which is adapted for optically projecting in a second imaging mode a display Image (DI) so as to generate at least one real projection image (PI) corresponding to laid display image (DI),
wherein an optical objective arrangement (10) is provided, wherein said optical objective arrangement (10) or a part thereof is adapted to work in said first imaging mode as an image recording objective or camera objective or as a part thereof,
wherein said optical objective arrangement (10) or a part thereof is adapted to work in said second imaging mode as an image projecting objective or projector objective or as, a part thereof,
wherein image sensor means (40) is provided for receiving and/or recording said real object image (OI) in said first imaging mode, wherein illumination unit (50) is provided for optically projecting together with said optical objective arrangement (10) said display image (DI) in said second imaging mode in order to obtain said projection image (PI), and
wherein a common polarization selective beam splitter device (20) is provided in the optical paths and located between said optical objective arrangement (10) and said image sensor means (40) on the one hand and between said optical objective arrangement (10) and said illumination unit (50) on the other hand in order to couple light for said real object image (OI) from said optical objective arrangement (10) into said image sensor means (40) in said first imaging mode and in order to couple light for said display image (DI) from said illumination unit (50) into said optical objective arrangement (10) in said second imaging mode.

2. Imaging device according to claim 1, which is adapted for externally projecting said display image (DI) so as to obtain an external real projection image (PI).

3. Imaging device according to claim 1, which is adapted for generating said object image (OI) in an analogue or digital manner.

4. Imaging device according to wherein said image sensor means comprises at least one charge coupled device.

5. Imaging device according to claim 1, wherein storage means (80) is provided for storing image information (DII, OII) of said real object image (OI), said display image (DI) or derivatives thereof.

6. Imaging device according to claim 1, wherein an evaluation/control unit (70) is provided for controlling said first and second imaging modes.

7. Imaging device according to claim 6, wherein said evaluation/control unit (70) is adapted to extract from said image sensor means (40), to evaluate and/or to store on said storage means (80) image information (OII) corresponding to said real object image (OI).

8. Imaging device according to claim 6, wherein said evaluation/control unit 70 is adapted to control the formation of said projection image (PI, based on image information (DII), corresponding to said display image (DI) to be projected and stored and read from said storage means (80) or externally supplied.

9. Imaging device according to claim 1, wherein said illumination unit (50) is adapted to be controlled by said evaluation control unit (70) and/or by said storage means (80).

10. Imaging device according to claim 1, wherein said illumination unit (50) comprises a light source device appropriate for projection purposes.

11. Imaging device according to claim 1, wherein said illumination unit (50) comprises a light valve device.

12. Imaging device according to claim 10, wherein said light valve device (30) comprises a single light valve for all fundamental colors or one light valve for each fundamental color.

13. Imaging device according to claim 1, which is adapted to display images currently taken and/or previously recorded to a spectator by displaying in a viewfinder mode respective images by means of provided viewfinder optics (60).

14. Imaging device according to claim 13, wherein said viewfinder optics (60) comprises a viewfinder screen (61) for generating a real image.

15. Imaging device according to claim 13, wherein said viewfinder optics (60) comprises a viewfinder eyepiece (62) for generating a virtual image.

16. Imaging device according to claim 1, which is adapted to process a plurality of images.

17. Imaging device according to claim 1, which is a camcorder device having projector capabilities.

* * * * *